United States Patent
Kim et al.

(10) Patent No.: US 6,937,707 B2
(45) Date of Patent: Aug. 30, 2005

(54) METHOD OF TRANSMITTING ONE TEXT MESSAGE TO MANY RECEIVERS

(75) Inventors: Yeoun Suk Kim, Kyungki-Do (KR); Sung Hoi Shin, Kyungki-Do (KR)

(73) Assignee: LG Electronics, Inc., Seoul (KR)

( * ) Notice: Subject to any disclaimer, the term of this patent is extended or adjusted under 35 U.S.C. 154(b) by 290 days.

(21) Appl. No.: 09/987,096

(22) Filed: Nov. 13, 2001

(65) Prior Publication Data

US 2002/0057774 A1 May 16, 2002

(30) Foreign Application Priority Data

Nov. 15, 2000 (KR) ........................................ 2000-67663

(51) Int. Cl.[7] ............................................. H04M 11/00
(52) U.S. Cl. .................. 379/93.01; 379/93.17
(58) Field of Search ...................... 379/93.24, 93.17, 379/93.01, 88.13, 88.22, 355.01, 355.02; 455/564, 566

(56) References Cited

U.S. PATENT DOCUMENTS

| | | | | |
|---|---|---|---|---|
| 5,315,642 A | * | 5/1994 | Fernandez | 379/93.17 |
| 5,515,034 A | * | 5/1996 | Otsuka et al. | 340/825.07 |
| 6,085,101 A | * | 7/2000 | Jain et al. | 455/500 |
| 6,215,859 B1 | * | 4/2001 | Hanson | 379/88.22 |
| 6,580,784 B2 | * | 6/2003 | Rodriguez et al. | 379/88.12 |
| 6,618,763 B1 | * | 9/2003 | Steinberg | 379/93.24 |

* cited by examiner

Primary Examiner—Stella Woo
(74) Attorney, Agent, or Firm—Fleshner & Kim, LLP

(57) ABSTRACT

A method of transmitting one text message to a plurality of receivers is disclosed. The method includes inputting numbers of the receivers and a text message to be transmitted, determining a type of a transmission speed of the inputted text message, and transmitting the inputted text message of the determined type to numbers of the respective receivers. If the text message transmission succeeds, the method further includes confirming whether any further receivers of the text message exist and, if so, inputting new numbers of the further receivers and re-transmitting the corresponding text message to the new numbers of the further receivers. In inputting the phone numbers of the receivers, the sender can transmit the text message more rapidly and conveniently using the phonebook function and one-touch dial function.

32 Claims, 4 Drawing Sheets

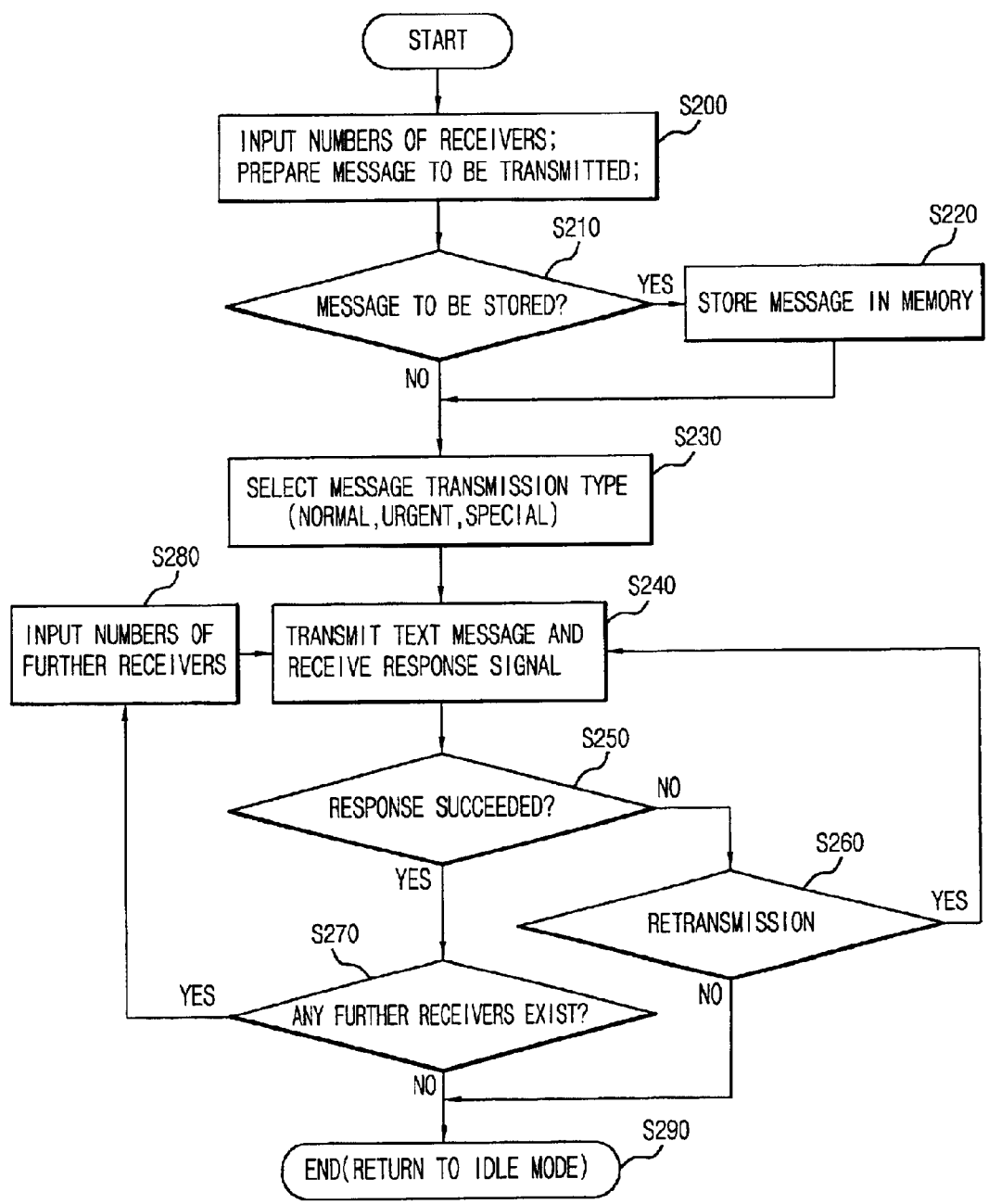

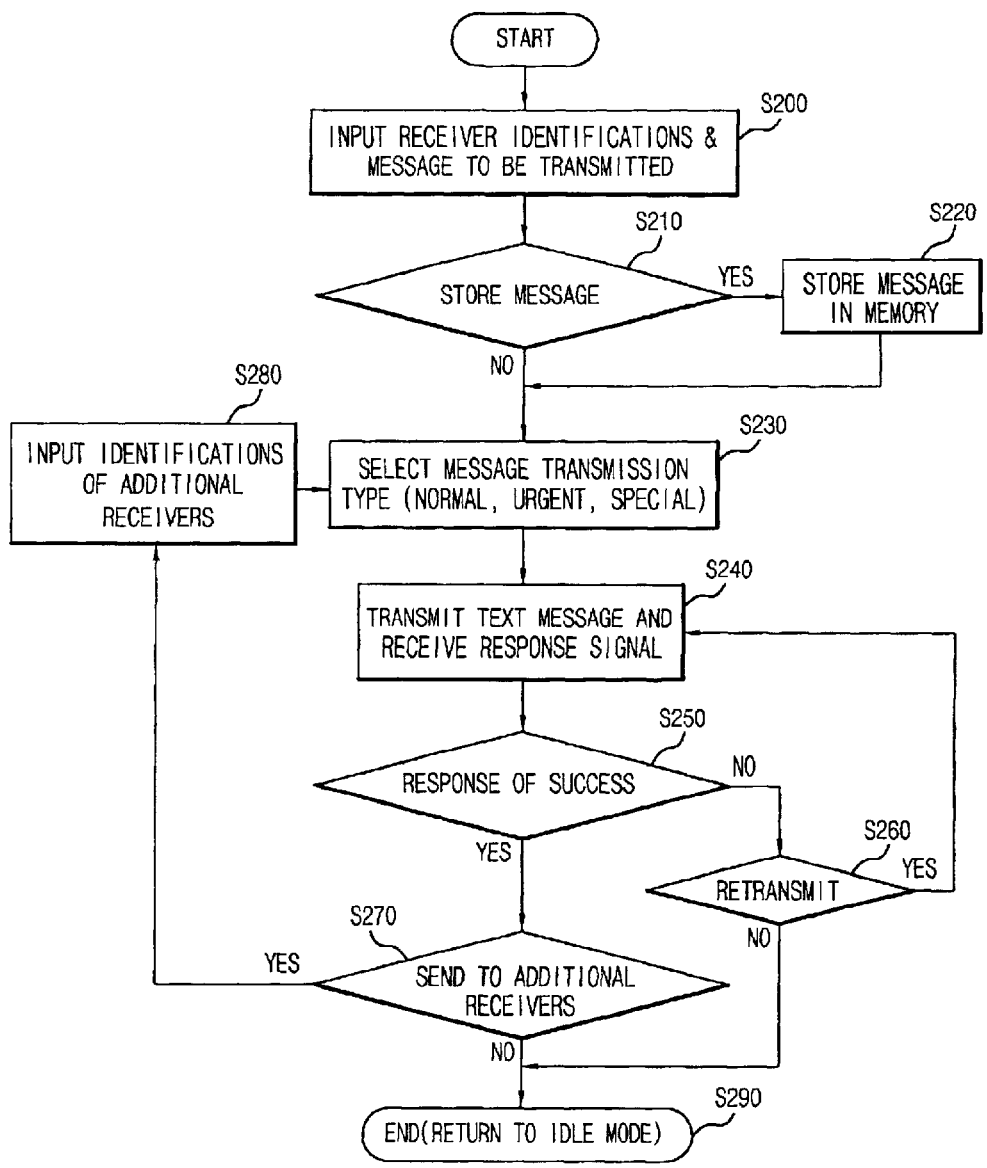

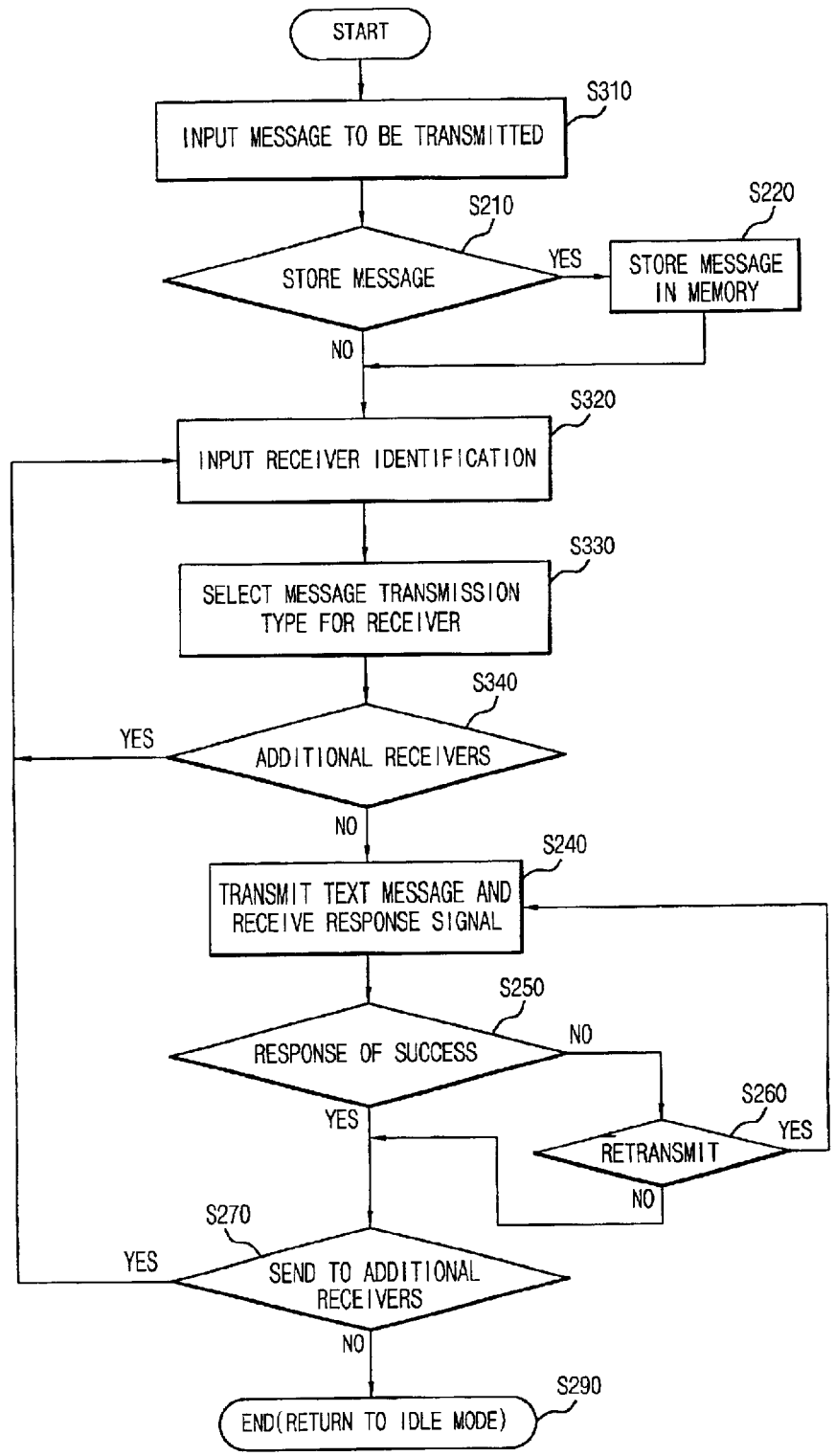

METHOD OF TRANSMITTING ONE TEXT MESSAGE TO MANY RECEIVERS

BACKGROUND OF THE INVENTION

1. Field of the Invention

The present invention relates to a text message transmitting method and, more particularly, to a method of transmitting one text message to a plurality of receivers.

2. Background of the Related Art

As the use of mobile communication terminals, such as cellular phones, PCS phones, personal digital assistants (PDAs), etc., increases with the development of mobile communication techniques, diverse additional services using the mobile communication terminal, such as voice message services, radio data communication services, text message services, etc., have been developed. Among them, the text message service has become a more important message transferring method than the voice call service, with respect to youngsters in their teens and twenties. Also, in order to satisfy the consumers' tastes and to improve the quality of service, communication service providers and terminal manufacturers have made a great investment in the development of diverse services and the manufacture of terminals having more useful functions.

FIG. 1 is a flowchart illustrating a related art text message transmitting process for a mobile communication terminal. A sender selects a text message function from a function selection menu that is displayed on a screen of the terminal. The sender then prepares a text message to be transmitted with a phone number of the terminal that is intended to receive the message (step S100).

Thereafter, it is determined whether to store the prepared text message (step S110). If the sender intends to store the message, he/she selects a "message storage" command on a display section of the screen and the text message is stored in a memory (step S120). Then, the sender selects one of the message transmission types, which are classified into normal, urgent, and special (step S130), and the preparation of the text message transmission is completed. A message appears on the display section of the terminal (e.g., "Transmission?") prompting the sender for a command to initiate the text message transmission (not illustrated).

If the text message is transmitted (step S140), the sender terminal, after several seconds, receives a response signal indicating the result of transmission from a message transmission center. The sender terminal analyzes the response signal and judges whether the transmission succeeded (step S150).

If the text message transmission succeeded, the sender terminal displays a message (e.g., "Transmission has been completed") to inform the sender of the successful transmission and returns to an idle mode (steps S170 and S180). If the text message transmission failed, the sender terminal displays a message (e.g, "Retransmission?") asking the sender whether to retransmit and also displays a message (e.g., "Transmission failed") to inform the sender of the transmission failure (step S160). The sender terminal then waits for the sender's command for retransmission.

The retransmission process performed as a result of the transmission failure includes transmitting the prepared text message, receiving the response signal from the message transmission center (step S140), and judging whether the transmission succeeded by analyzing the response signal (step S150). These steps (S140 and S150) are repeated until the text message is successfully transmitted. However, if the sender does not want the retransmission, the sender terminal returns to the idle mode (step S180).

Consequently, when one text message is transmitted to a plurality of receivers, the sender should repeat the above steps (steps S100 to S180) for each receiver. For each receiver that is to receive the text message, the sender inputs the respective receiver's phone number during a separate execution of process steps S100 to S180.

As described above, according to the related art text message transmission method, the sender should repeat a series of processes, such as inputting the respective receiver's phone number, the text message, the message transmission type (i.e., "normal", "urgent", or "special"), and the transmission command, for each separate recipient receiver when transmitting the text message to a plurality of receivers. This causes inconvenience for the sender and makes it difficult to achieve a rapid transmission of the text message.

SUMMARY OF THE INVENTION

An object of the invention is to solve at least the above problems and/or disadvantages and to provide at least the advantages described hereinafter.

A further object of the invention is to provide a method of transmitting one text message to a plurality of receivers that enables a collective transmission of the text message.

A further object of the invention is to reduce the input operations needed to identify the receivers.

In accordance with the present invention, these objects are accomplished in whole or in part by providing a method of transmitting one text message to a plurality of receivers. The method includes inputting numbers of the receivers and a text message to be transmitted; determining a type of a transmission speed of the inputted text message; and transmitting the inputted text message of the determined type. If the text message transmission succeeds, the method further includes confirming whether any further receivers of the text message exist. If further receivers exist, the method further includes inputting new numbers of the corresponding receivers and re-transmitting the text message to the newly identified receivers. The method according to the present invention may further comprise returning to an idle mode if no further receivers exist.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as. particularly pointed out in the appended claims.

BRIEF DESCRIPTION OF THE DRAWINGS

The invention will be described in detail with reference to the following drawings in which like reference numerals refer to like elements wherein:

FIG. 2 illustrates a flowchart of a text message transmission process for a mobile communication terminal according to a first preferred embodiment of the present invention;

FIG. 2A illustrates a flowchart of a text message transmission process for a mobile communication terminal, according to a second preferred embodiment of the present invention; and FIG. 3 illustrates a flowchart of a text message transmission process for a mobile communication terminal, according to a third preferred embodiment of the present invention.

DETAILED DESCRIPTION OF PREFERRED EMBODIMENTS

Figure 1:
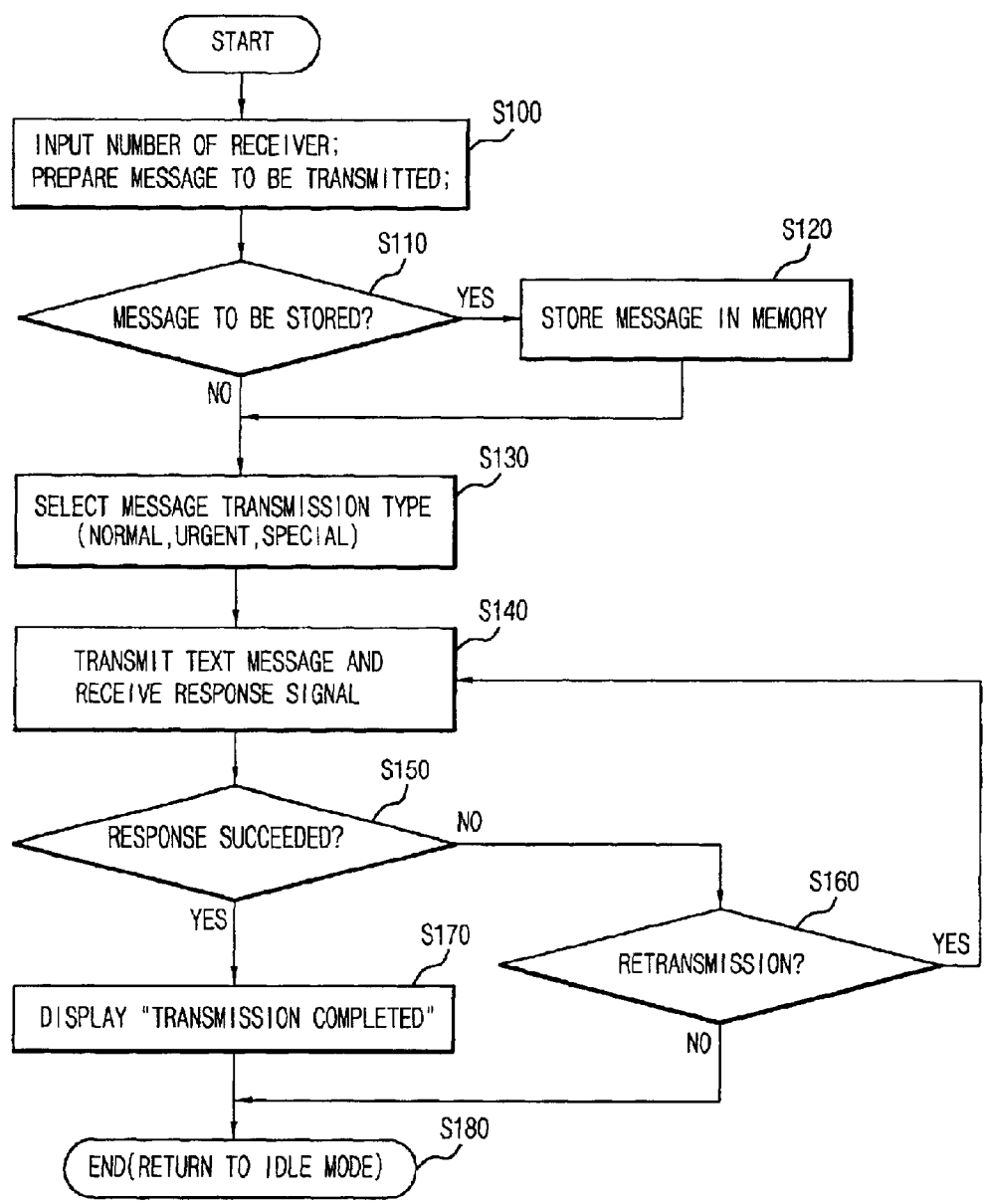
FIG. 1 illustrates a flowchart of the related art text message transmission process for a mobile communication terminal.

FIG. 2 is a flowchart illustrating a text message transmission process for a mobile communication terminal according to the present invention. A sender inputs phone numbers of the recipient receivers, after selecting a text message function from a function selection menu of the terminal (step S200). The phone numbers of the receivers are inputted using a phonebook function. The phonebook function is a basic function of the terminal set to enable the storage, deletion, and editing of phone numbers. The phonebook function is implemented at the receiver's number input step (step S200). For the collective transmission of the text message to many receivers, the corresponding phone numbers are inputted at the receiver's number input step (step S200).

After the phone numbers of the receivers are inputted, the sender prepares the text message (step S200) and then determines whether to store the prepared message (step S210). Then, the sender selects one of the message transmission types, which are classified into normal, urgent, and special transmission (step S230), to complete the preparation of the text message transmission. A message appears on a display section of the terminal screen (e.g., "Transmission?") prompting the sender to enter a text message transmission command (not illustrated).

If the text message is transmitted, the sender terminal, after several seconds, receives a response signal from a message transmission center (step S240). The sender terminal analyzes and judges whether the transmission succeeded based on this response message (step S250). The sender terminal displays a message to inform the sender whether the transmission succeeded. If the text message transmission failed, the sender terminal displays a message (e.g., "Transmission failed. Retransmission?") asking the sender whether to retransmit the text message and waits for the sender's command (step S260). If the sender commands the retransmission, the sender terminal feeds back to step S240 and retransmits the prepared text message. This retransmission process (steps S240-S260) is repeated until the text message is successfully transmitted. If the sender does not want the retransmission, the terminal returns to the idle state.

If the transmission of the text message succeeds, the sender terminal displays a message (e.g., "Transmission succeeded. Do any further receivers exist?") asking the sender whether any further receivers shown on the display section are to receive the text message. Thereafter, the sender terminal waits for the sender's command (step S270).

If no further receivers are intended to receive the text message, the sender terminal terminates the text message transmission process and returns to the idle mode (step S290). However, if further receivers exist to which the text message is to be transmitted, the sender terminal receives the input of phone numbers of the corresponding receivers (step S280). At this time, the receiver phone number input process is the same as the receiver phone number input of step S200.

If the phone numbers of the new receivers are inputted, a message (e.g., "Retransmission?") appears on the display section of the sender terminal and the sender terminal waits for the sender's command of text message transmission (not illustrated). When the command is received, the sender terminal repeats the above steps S240, S250, and S270.

If any further receivers to which the text message is to be transmitted exist after the completion of the collective transmission to the plurality of receivers, the sender terminal performs the text message transmission steps S280, S240, S250, and S270 successively. Also, the phone numbers of the receivers are more easily inputted through the application of the existing one-touch dial function of the terminal (i.e., the function of inputting recently used phone numbers by pressing specified buttons), as described above.

FIG. 2A illustrates a flowchart of a text message transmission process for a mobile communication terminal, according to a second preferred embodiment of the present invention. The flowchart of FIG. 2A is similar to that of FIG. 2. For brevity, only a description of the dissimilarities will be provided below.

Step 280 of FIG. 2A provides the sender the opportunity to send the message to additional receivers, as is the case for the process of FIG. 2. However, in this second embodiment, the process transitions to step 230, after the entry of the identifications for the additional receivers. Step 230 provides the sender the opportunity to select the message transmission type for the additional receivers. Once the sender selects the message transmission type for these additional receivers, the text message is transmitted to the additional receivers using the corresponding message transmission type (S250).

FIG. 3 illustrates a flowchart of a text message transmission process for a mobile communication terminal, according to a third preferred embodiment of the present invention. After selecting a text message function from a function selection menu of the terminal, a sender inputs the text message intended for transmission to a number of receivers (S310). Upon completing the entry of the text message, the sender is prompted by a display on the terminal screen to enter a command indicating whether the text message should be stored to memory. If the sender commands the terminal to store the text message, it is stored to memory (S220) and the transmission process continues with step S320. Otherwise, the transmission process continues with step S320 without storing the text message to memory.

The sender is prompted to enter the phone number (i.e., identification) of a receiver that is intended to receive the text message, using the phonebook function of the terminal. After the sender identifies a receiver (S320), the terminal prompts the sender to select a message transmission type for the identified receiver. When the sender selects the message transmission type (e.g., normal, urgent, and special), the terminal prompts the sender to enter a command instructing it whether to continue with the entry of receiver identifications (S340). If the sender instructs the terminal to continue the process of identifying receivers of the text message, the transmission process transitions to step S320. Otherwise, the transmission process continues by transmitting the text message to the collective group of identified receivers (S240). Process steps S320, S330, and S340 are repeatedly performed until all of the intended text message recipients have been identified.

If the text message is successfully transmitted, the sender terminal receives a response signal from a message transmission center, after several seconds (step S240). The sender terminal determines whether the transmission succeeded based on this response message (step S250). The sender terminal displays a message to inform the sender whether the transmission succeeded. If the text message transmission failed, the sender terminal displays a message (e.g., "Transmission failed. Retransmission?") prompting the sender to enter a command. If the sender commands the terminal to retransmit the text message, the terminal retransmits the text message to the recipient that failed to receive the text message previously (S240). This retransmission process (steps S240–S260) is repeated until the text message is successfully transmitted.

If the sender commands the terminal not to retransmit the message or if the transmission of the text message to the collective group of recipients succeeds, the terminal provides the sender the opportunity to send the text message to additional receivers. The terminal displays a message (e.g., Do any further receivers exist?") prompting the sender to enter a command. If the sender commands the terminal to terminate the transmission process, then the terminal returns to its idle mode of operation (S290). Otherwise, the terminal prompts the sender to enter the identification of another receiver that is intended to receive the text message (S320).

According to the related art text message transmission method, the sender should repeat the message transmission process as many times as the number of the receivers, in such a manner that the sender inputs the phone numbers of the receivers one by one when the sender transmits one text message to a plurality of receivers. With the present invention, the performance of the above unnecessary process is avoided. To more effectively transmit the text message, the phone numbers of the plurality of receivers are inputted at the receiver number input step. Also, in inputting the phone numbers of the receivers, the sender can transmit the text message more rapidly and conveniently using the phonebook function and one-touch dial function.

Also, by arranging the receiver number input process (steps S200 and S280) in front of and behind the text message transmission process (step S240), the sequential transmission of the message becomes possible in addition to the collective transmission of the message.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A method of transmitting a text message, comprising:
   receiving identification numbers of a plurality of receiver terminals and a text message to be transmitted;
   receiving information indicative of a message transmission type of the inputted text message;
   transmitting the inputted text message to the plurality of receiver terminals using the determined message transmission type; and
   if the text message transmission succeeds, confirming whether any further receiver terminals of the text message exist and, if no further receivers exist, returning to an idle mode, wherein the identification numbers are phone numbers registered in a phonebook of a sender's terminal.

2. The method of claim 1, further comprising sequentially transmitting the text message to the further receiver terminals, if the further receiver terminals exist.

3. The method of claim 2, wherein sequentially transmitting the text message further comprises:

receiving the identification numbers of the corresponding further receiver terminals; and
re-transmitting the text message to the further receiver terminals.

4. The method of claim 3, wherein the identification numbers of the plurality of receiver terminals and the further receiver terminals are inputted through a one-touch dial function.

5. The method of claim 1, wherein the plurality of receiver terminals is more than two.

6. The method of claim 1, further comprising:
   confirming that the text message was successfully transmitted to the plurality of receiver terminals, said confirmation performed before confirming whether any further receiver terminals of the text message exist.

7. The method of claim 1, wherein transmitting the text message includes:
   transmitting the text message to the plurality of receiver terminals in response to a single user keystroke.

8. The method of claim 1, wherein the text message is collectively transmitted to the plurality of receiver terminals.

9. The method of claim 8, further comprising:
   determining whether the text message was successfully transmitted to the plurality of receiver terminals, said determining step being performed after the text message is collectively transmitted to the plurality of receiver terminals.

10. The method of claim 1, wherein the receiver terminals are mobile receiver terminals.

11. The method of claim 1, wherein the text message is transmitted to the plurality of receiver terminals without first performing a check to determine whether successful transmission occurred.

12. A method of transmitting a text message, comprising:
   receiving identification numbers of a plurality of receiver terminals and a text message to be transmitted;
   receiving information indicative of a message transmission type of the inputted text message;
   transmitting the inputted text message to the plurality of receiver terminals using the determined message transmission type;
   if the text message transmission succeeds, confirming whether any further receiver terminals of the text message exist and, if the further receiver terminals exist, sequentially transmitting the text message to the further receivers; and if no further receiver terminals exist, returning to an idle mode, wherein the identification numbers are phone numbers registered in a phonebook of a sender's terminal.

13. The method of claim 12, wherein the number of receiver terminals is at least two.

14. The method of claim 12, wherein sequentially transmitting the text message further comprises:
   receiving the identification numbers of the corresponding further receiver terminals; and
   re-transmitting the text message to the further receiver terminals.

15. The method of claim 14, further comprising determining the message transmission type for the further receiver terminals, before re-transmitting the text message to the further receiver terminals.

16. The method of claim 12, wherein the identification numbers of the plurality of receiver terminals and the further receiver terminals are inputted through a one-touch dial function.

17. The method of claim 12, further comprising:
confirming that the text message was successfully transmitted to the plurality of receiver terminals, said confirmation performed before confirming whether any further receiver terminals of the text message exist.

18. The method of claim 12, wherein transmitting the text message includes: transmitting the text message to the plurality of receiver terminals in response to a single user keystroke.

19. The method of claim 12, wherein the text message is collectively transmitted to the plurality of receiver terminals.

20. The method of claim 19, further comprising:
determining whether the text message was successfully transmitted to the plurality of receiver terminals, said determining step being performed after the text message is collectively transmitted to the plurality of receiver terminals.

21. The method of claim 12, wherein the receiver terminals are mobile receiver terminals.

22. The method of claim 12, wherein the text message is transmitted to the plurality of receiver terminals without first performing a check to determine whether successful transmission occurred.

23. A method of transmitting a text message, comprising:
receiving identification numbers of a plurality of receiver terminals and a text message to be transmitted;
receiving information indicative of a message transmission type of the inputted text message;
transmitting the inputted text message to the plurality of receiver terminals using the determined message transmission type;
if the text message transmission succeeds, confirming whether any further receiver terminals of the text message exist; and
if the further receiver terminals exist, inputting the identification numbers of the further receiver terminals and re-transmitting the text message to the further receiver terminals, wherein the identification numbers are phone numbers registered in a phonebook of a sender's terminal.

24. The method of claim 23, further comprising returning to an idle mode, if no further receiver terminals exist.

25. The method of claim 23, wherein the number of receiver terminals is at least two.

26. The method of claim 23, wherein the identification numbers of the number of receiver terminals and the further receiver terminals are inputted through a one-touch dial function.

27. The method of claim 23, further comprising determining the message transmission type for the further receiver terminals, before re-transmitting the text message to the further receiver terminals.

28. A method of communicating, comprising:
(a) receiving a text message into a sender terminal;
(b) receiving an identification of a receiver terminal that is intended to receive the text message;
(c) receiving a message transmission type for the receiver terminal;
(d) determining whether another receiver terminal is intended to receive the text message;
(e) repeating steps (b), (c), and (d) until every receiver terminal intended to receive the text message is identified; and
(f) collectively transmitting the text message to the identified receiver terminals.

29. The method of claim 28, further comprising:
determining whether the text message was successfully communicated to every receiver terminal identified; and
re-transmitting the text message to a group of the identified receiver terminals that failed to receive the text message, in accordance with a user command.

30. The method of claim 28, further comprising:
determining whether the text message will be sent to an additional receiver terminal, after the text message has been transmitted to the identified receiver terminals;
repeating steps (b), (c), and (d) for each additional receiver terminal that is intended to receive the text message; and
collectively transmitting the text message to each of the additional receiver terminals identified.

31. A method of transmitting a text message, comprising:
receiving identification numbers of a plurality of receiver terminals and a text message to be transmitted;
receiving information indicative of a message transmission type of the inputted text message;
transmitting the inputted text message to the plurality of receiver terminals using the determined message transmission type; and
if the text message transmission succeeds, confirming whether any further receiver terminals of the text message exist and, if no further receivers exist, returning to an idle mode, wherein confirming whether further receiver terminals exist includes:
displaying a message requesting entry of identification numbers of the further terminals; and
receiving input from a user in response to said message.

32. The method of claim 31, further comprising:
transmitting the inputted text message using the identification numbers of the further receiver terminals.

* * * * *